(12) United States Patent
Prosser et al.

(10) Patent No.: US 9,000,943 B2
(45) Date of Patent: Apr. 7, 2015

(54) UTILITY NETWORK MANAGEMENT SYSTEM

(75) Inventors: Ronald D. Prosser, Huntington Beach, CA (US); Victor Shao, Mountain View, CA (US); A. Arthur Kressner, Westfield, NJ (US)

(73) Assignees: Green Charge Networks, Santa Clara, CA (US); Consolidated Edison of New York, Inc., New York, NY (US)

( * ) Notice: Subject to any disclaimer, the term of this patent is extended or adjusted under 35 U.S.C. 154(b) by 501 days.

(21) Appl. No.: 13/403,950

(22) Filed: Feb. 23, 2012

(65) Prior Publication Data

US 2013/0063278 A1 Mar. 14, 2013

Related U.S. Application Data

(60) Provisional application No. 61/508,530, filed on Jul. 15, 2011.

(51) Int. Cl.
| | |
|---|---|
| *G08B 23/00* | (2006.01) |
| *G01F 23/74* | (2006.01) |
| *G01F 23/72* | (2006.01) |
| *G01F 23/76* | (2006.01) |

(52) U.S. Cl.
CPC ............... *G01F 23/74* (2013.01); *G01F 23/72* (2013.01); *G01F 23/76* (2013.01)

(58) Field of Classification Search
USPC .................................................. 340/870.02
See application file for complete search history.

(56) References Cited

U.S. PATENT DOCUMENTS

| | | | | |
|---|---|---|---|---|
| 6,122,603 A | * | 9/2000 | Budike, Jr. ..................... | 702/182 |
| 6,636,239 B1 | * | 10/2003 | Arquie et al. .................. | 715/736 |
| 8,184,016 B2 | * | 5/2012 | Gray et al. ............... | 340/870.11 |
| 8,600,556 B2 | * | 12/2013 | Nesler et al. .................. | 700/275 |
| 2011/0039237 A1 | * | 2/2011 | Skare ............................ | 434/118 |
| 2012/0029897 A1 | * | 2/2012 | Cherian et al. ................. | 703/18 |

* cited by examiner

*Primary Examiner* — Kerri McNally
(74) *Attorney, Agent, or Firm* — Richard C. Galati; Holland & Hart LLP (57) ABSTRACT

A computer-implemented method and system of providing utility service network information for a utility service network. The method includes obtaining utility service network information from a plurality of external sources, integrally combining the utility service network information obtained from each of the plurality of external sources into and displaying the utility service network information in real-time in a global positioning map to a user via a graphical user interface, selecting, via the user, specific utility service network information of the utility service network information, to be displayed, and automatically reconfiguring the system or manually reconfiguring the utility service network via the user, as needed based on the specific utility service network information selected.

23 Claims, 8 Drawing Sheets

UTILITY NETWORK MANAGEMENT SYSTEM

CROSS REFERENCE TO RELATED APPLICATIONS

This application claims priority and cross-reference to the following prior-filed patent application and it is hereby incorporated by referenced in its entirety: U.S. provisional patent application No. 61/508,530 filed Jul. 15, 2011 titled, "Cluster Mapping to Highlight Areas of Electrical Congestion".

BACKGROUND

The present invention relates generally to utility services, and more specifically, to a method and system for providing visual tools to identify and enable reconfiguration of areas of high electrical congestion and system outages in an automated and integrated way by analyzing a utility service grid/network.

Utility service networks periodically experience equipment failures and system outages. Typically, a grid/network is required to gather information by navigating through several applications to determine the source of the problem. The process of analyzing the system to determine the source of the problem and responding to these occurrences can be very time-consuming.

While existing methods for analyzing utility service network faults are suitable for their intended purpose, improvements may be made in providing a method and system that provides an integrated application of the utility service network and system conditions.

SUMMARY

According to one embodiment of the present invention, a method of providing visual tools of a utility service grid or network to obtain and determine the status of the grid and facilitate adjustments to avoid system and/or segment overloads is provided. In some embodiments, heat map and margin manager information may be located at a grid network control center and used by a network operator to observe or reconfigure the network as needed. In some embodiments a tool such as a margin manager is presented to the user with current data or model data about the status of the network and recommendation information associated therewith. Selected recommendations may have their effects on the grid network simulated and projected prior to implementation.

Embodiments of the present invention provide a method and system for providing grid or network information in a single integrated way. Therefore, the present invention provides the advantages of allowing the operator to simulate changes and see how the changes will impact the network prior to implementing the changes.

A computer readable storage medium and system performing the method mentioned above are also provided. Methods described herein may be computer-implemented.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention provide a method and system for performing the method of and system providing visual tools of a utility service grid/network to allow an operator(s) to determine the status of the grid and facilitate adjustments to avoid system and/or segment overloads. Embodiments of the present invention will be discussed in relation to electrical utility service components however the present invention is not limited hereto and may vary as necessary. According to an embodiment of the present invention, heat map and margin manager information is located at a grid network control center, for example, and used by a network operator(s) to monitor the network and to manually or automatically reconfigure the network as needed. The data is collected from sensors distributed on the electrical network and stored via a back-end aggregation server, for example.

Figure 1:
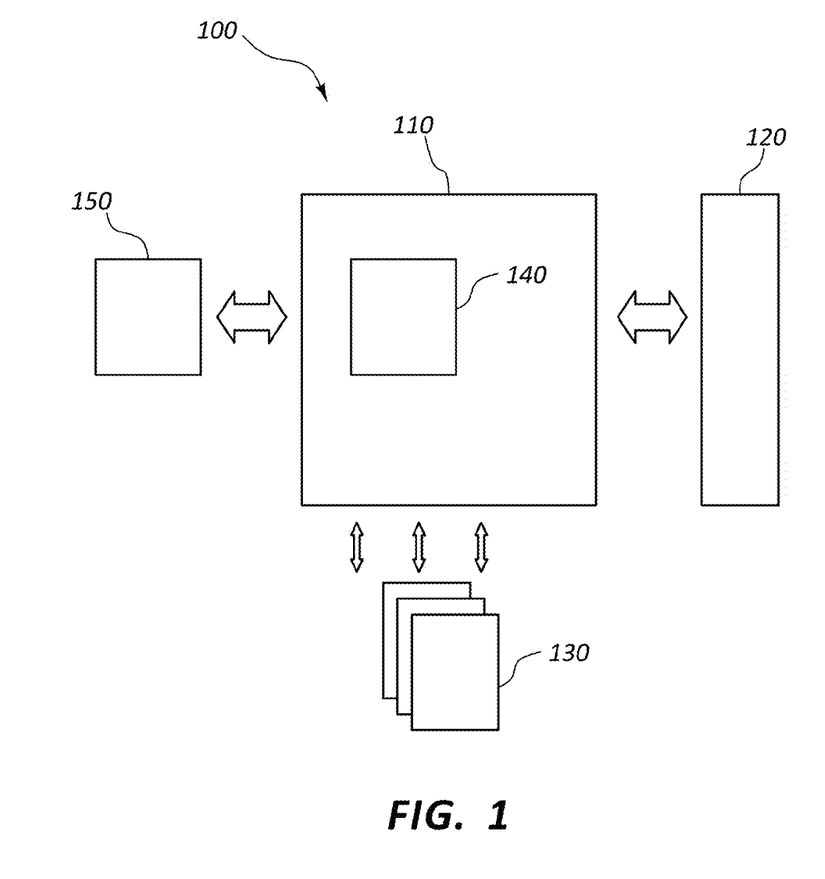
FIG. 1 is a block diagram illustrating a utility network management system that may be implemented within embodiments of the present invention.
Figure 2:
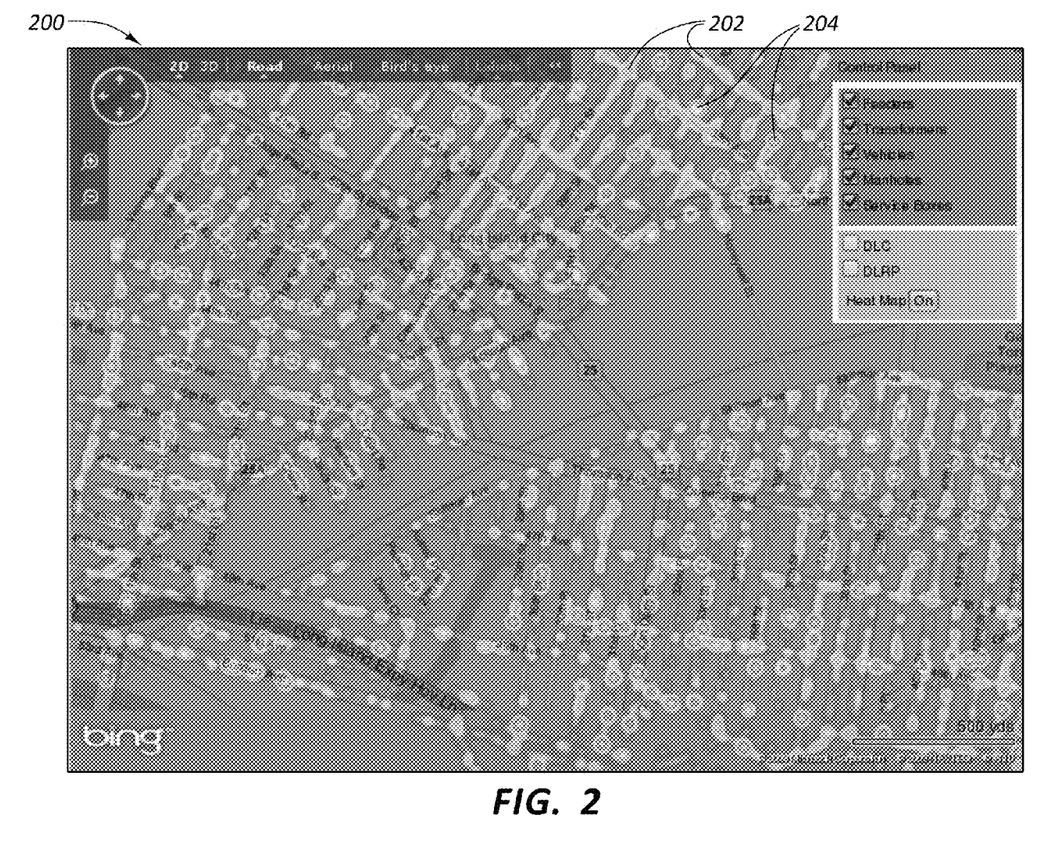
FIG. 2 is a screenshot illustrating a heat map of the utility network management system that can be implemented within embodiments of the present invention.

FIG. 1 is block diagram illustrating a system that can be implemented within embodiments of the present invention. According to an embodiment of the present invention, a system 100 includes a processing unit 110 and a graphical user interface 120 as shown in FIG. 1. The system 100 may be a general purpose computing device or other suitable computing device for the purpose set forth herein. The graphical user interface 120 is configured to receive and transmit data to and from a user and interface with the processing unit 110. The graphical user interface 120 may have touch screen capabilities or the user may input data via a stylus, for example. According to an embodiment of the present invention, the processing unit 110 obtains utility service network information from a plurality of external sources 130 and combines the utility network information into a single map (as depicted in FIG. 2, for example) and stores the obtained information in at least one database 140. According to an embodiment of the present invention, the network information comprises at least one of feeder information, transformer information, manhole information, service box information and system outage and overload information. Additional details regarding the utility service network information will be discussed below with reference to FIG. 2.

Referring back to FIG. 1, the processing unit 110 integrally combines the network information obtained from each external source 130 into a single graphical representation such as a global positioning map.

FIG. 2 is a screenshot illustrating a heat map of the electrical network management system that can be implemented within embodiments of the present invention. As shown in FIG. 2, the heat map 200 is a visual tool that allows an operator to view the status of a grid and to facilitate any adjustments. Different portions 202 of the heat map 200 represent various network equipment and occurrences on the grid/network. The equipment and/or occurrences may be represented using different colors, for example. According to an embodiment of the present invention, as shown in FIG. 2, electrical loads are shown and high or overloaded cable segments on the grid may be represented by color portions, such as the color "red", for example. In addition, according to an embodiment, a supply tool may be provided on the heat map 200 that shows local distributed generation and energy storage. Further, tools representing curtailable loads and customer outages may also be provided.

According to an embodiment of the present invention, the heat map based system is for use with complex or meshed grids that identify areas of high electrical congestion and combines the information in a global positioning map system. This information includes available distributed resources and conventional grid assets. It includes local energy assets usage, equipment and system health and status information, and provides rule-based decision aids that identify actions required for the system to reconfigure itself in order to optimize performance and or self heal the system. According to an embodiment of the present invention, the processing unit 110 shown in FIG. 1 dynamically updates the utility service network information.

According to an embodiment of the present invention, the heat map 200 includes a clustering function that reduces visual clutter on the display, reduces computer memory requirements and improves operating speed. The clustering function changes a number of items displayed via the display based on a level of zoom of the heat map 200 as depicted in FIGS. 2 through 5. For example, in FIG. 2, as the heat map 200 is zoomed out, the clustering function combines icons or segments into a cluster 204 and displays the cluster 204 as a single element as indicated by the circle depicted in FIG. 2. The operator may select the cluster 204 to view the assets within the cluster as shown in the example, of FIG. 3.

Figure 3:
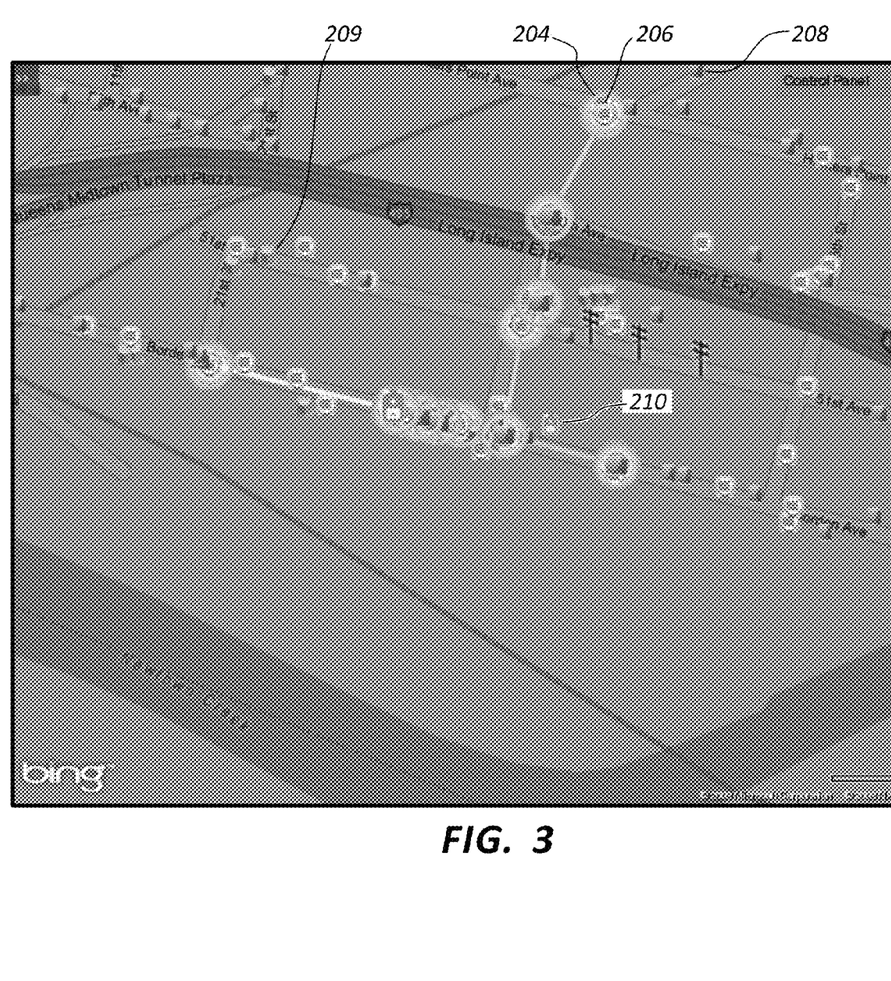
FIG. 3 is a screenshot illustrating an exploded view of the heat map shown in FIG. 2 that can be implemented within embodiments of the present invention.
Figure 4:
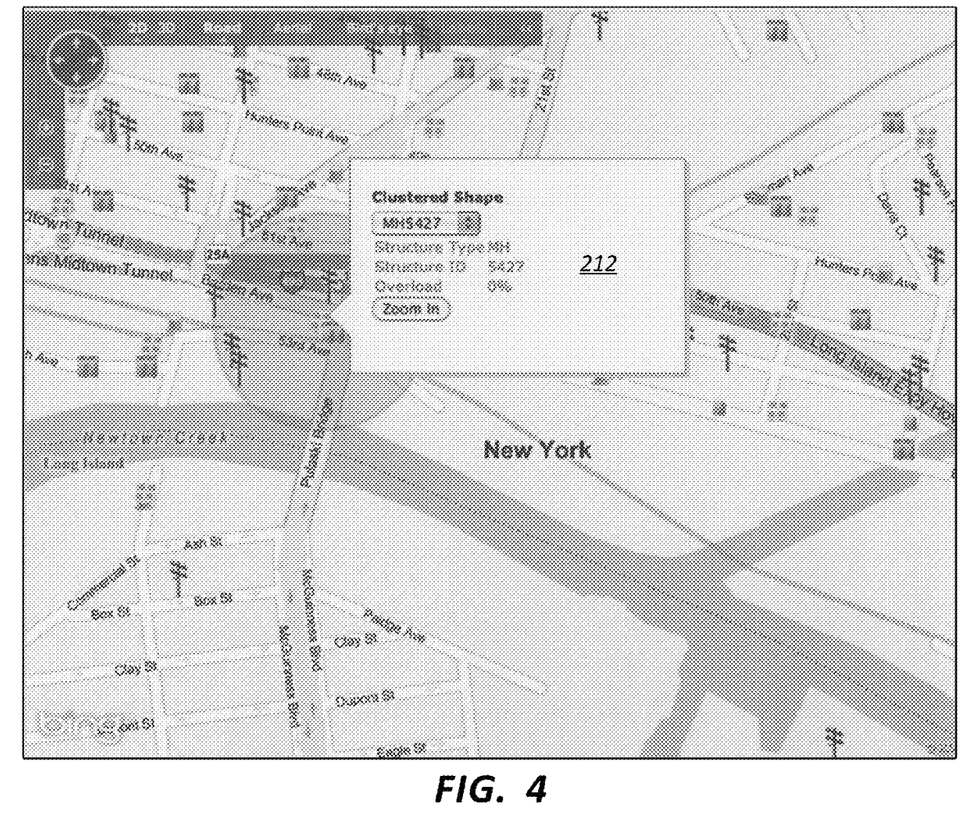
FIG. 4 is a screenshot illustrating a clustering function of the heat map shown in FIG. 2 that can be implemented within embodiments of the present invention.

FIG. 3 is a screenshot illustrating an exploded view of the heat map shown in FIG. 2 that can be implemented within embodiments of the present invention. FIG. 4 is a screenshot illustrating a clustering function of the heat map shown in FIG. 3 that can be implemented within embodiments of the present invention.

As shown in FIG. 3, the cluster 204 may be selected by the operator to be viewed by drawing a clustering shape (e.g., a circle) around the area affected. The cluster 204 shown here includes a manhole (shown overloaded). The heat map shown in FIG. 3 also illustrates a plurality of services boxes 208, network transformers 209 and a plurality of energy storage units 210. By drawing the cluster shape, associated information pertaining to the manhole, for example, is provided in a pop-up window 212 as shown in FIG. 4. The associated information may include the structure identification number, structure type, and current operating status. As the operator zooms in on the heat map 200, more elements are displayed.

Use of these clustering techniques avoids computer memory issues, such as running out of available memory, and improves usability by the operator.

Figure 5:
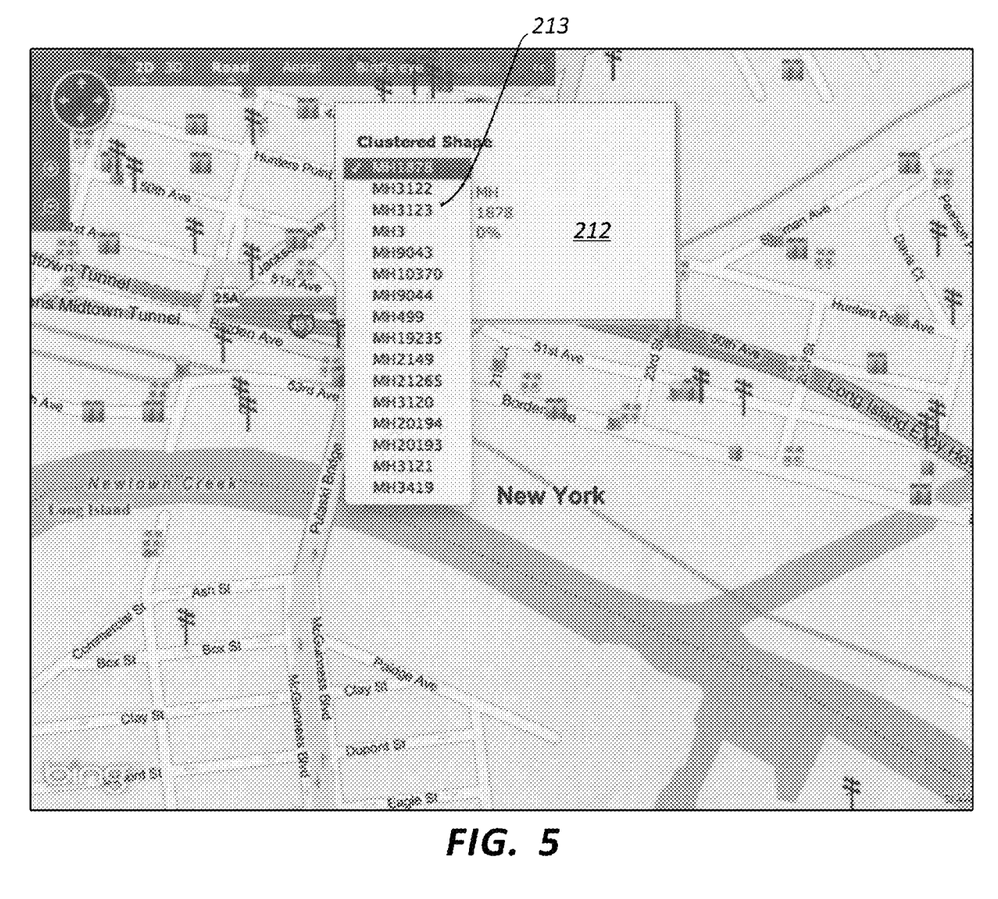
FIG. 5 is a screenshot illustrating another clustering function of the heat map shown in FIG. 2 that can be implemented within embodiments of the present invention.
Figure 6:
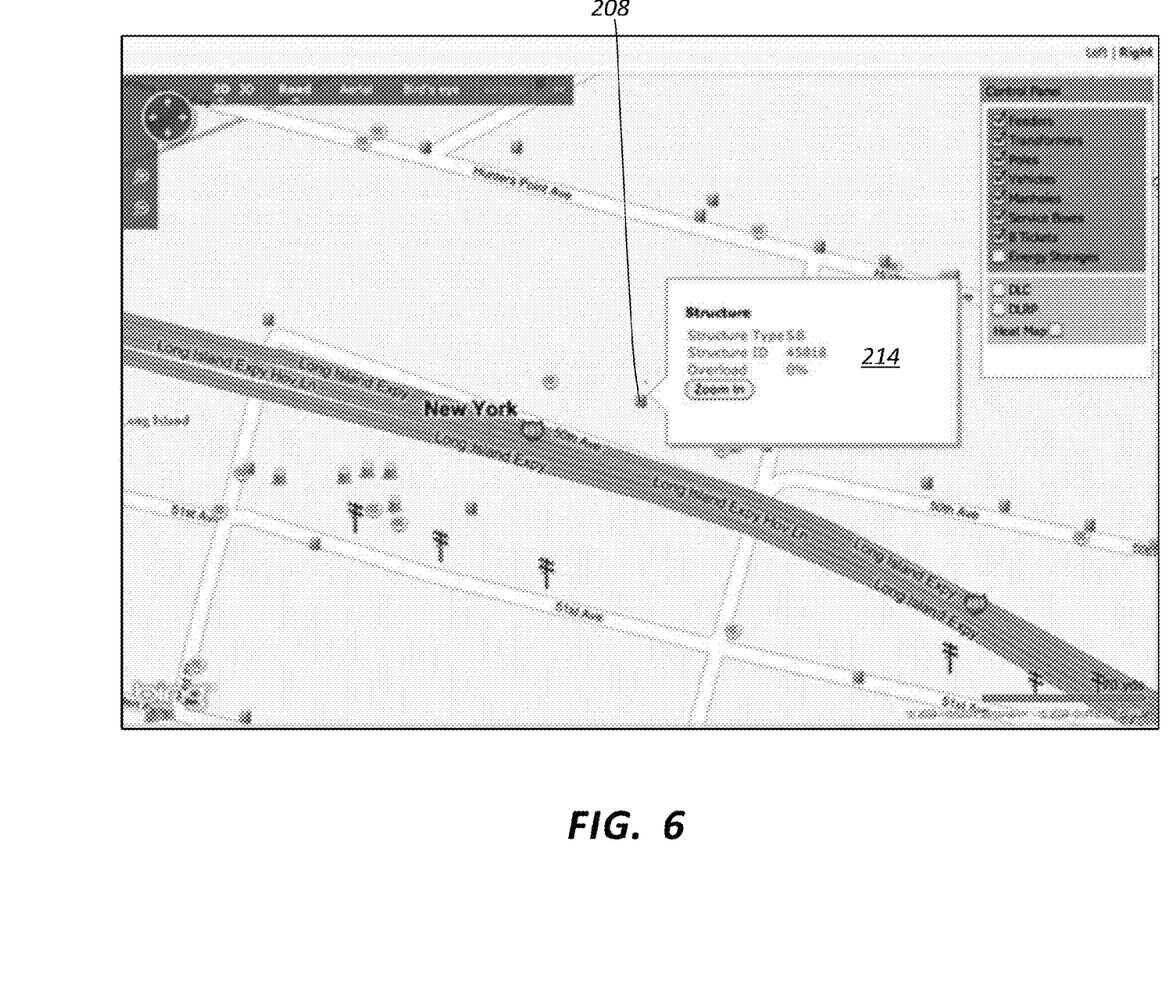
FIG. 6 is a screenshot illustrating specific structure information of the heat map shown in FIG. 2 that can be implemented within embodiments of the present invention.

Additional information may be provided to the user as shown in FIGS. 5 and 6. For example, as shown in FIG. 5, additional structure types may be selected by the user via a dropdown 213 within the pop-up window 212. Further, in FIG. 6, specific structure information may be provided to the user via a pop-up window 214 when selected.

According to an embodiment of the present invention, an operator is able to further analyze the grid/network and treat localized areas on the grid by using a margin manager system to be discussed below with reference to FIG. 7. When an overloaded area of concern (e.g., an overloaded segment) is identified by an operator on the heat map 200 as shown in FIG. 2, the operator selects the area of concern, such as by drawing a circle or other shape around it. The system 100 then displays a margin manager 700 typified by the embodiment shown in FIG. 7. The margin manager 700 targets less complex and/or radial systems and may be used in concert with the heat map 200 or separately depending on grid configuration. The margin manager 700 includes a plurality of graphs, 700a, 700b and 700c representing the area of concern. The graph 700a represents an electrical load on the area, graph 700b represents an electrical supply to the area, and graph 700c represents a margin between the electrical load shown in graph 700a and the supply shown in graph 700b.

According to an embodiment of the present invention, rule-based systems track available supply assets, local load including curtailable load and margin. The rule-based decision aids help evaluate options and provide recommendations or may automatically reconfigure the system to optimize performance/and or allow the grid/network to self heal.

According to an embodiment of the present invention, each graph 700a, 700b, and 700c has three portions. A first portion 701 represents a current operating condition. According to an embodiment of the present invention, the current operating condition is updated in substantially real-time. A second portion 702 represents historical data based on real time measurements or a modeled measurement. A third portion 703 represents a predicted condition (e.g., load, supply, and margin) based on mathematical models.

Figure 7:
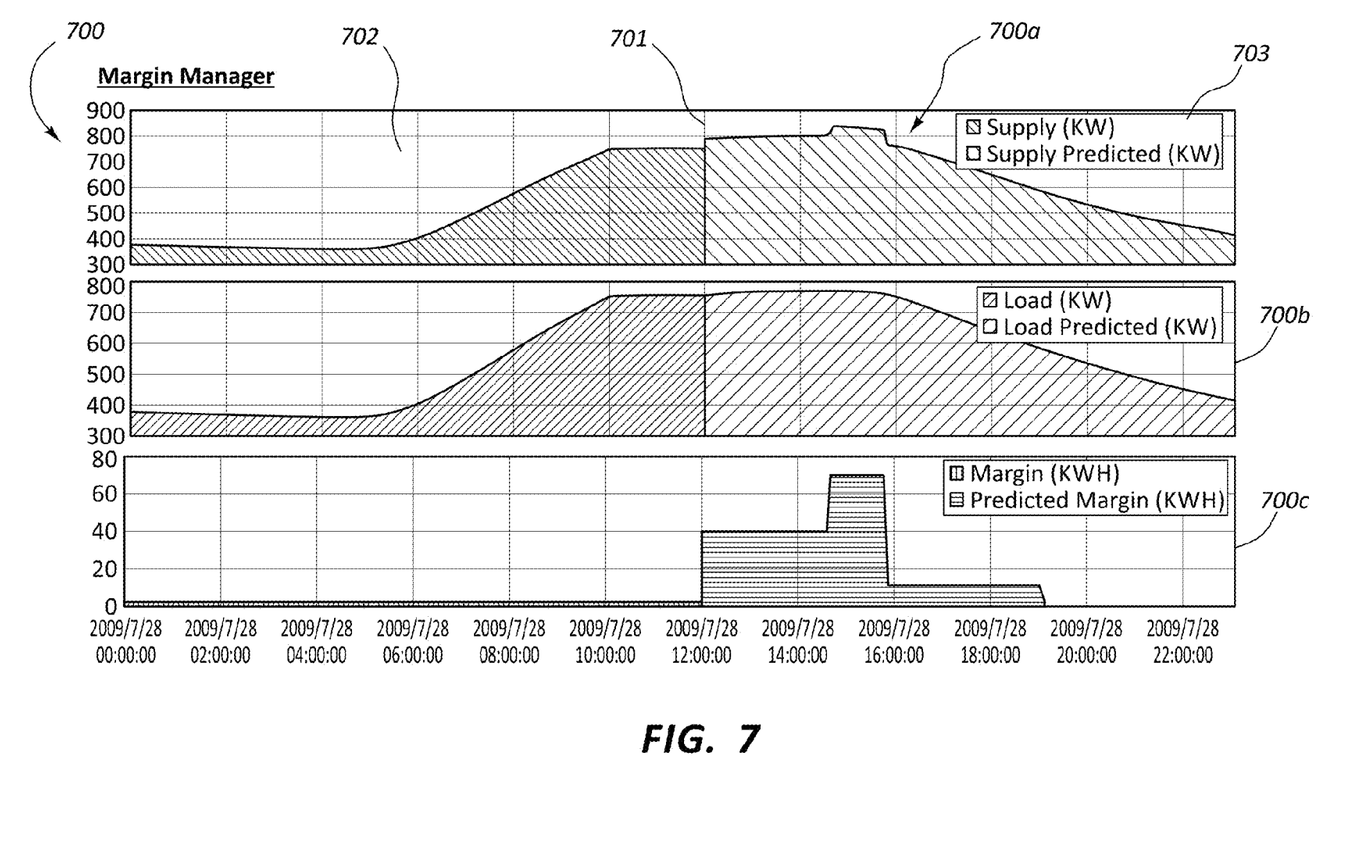
FIG. 7 is a diagram illustrating a margin manager of the utility network management system that can be implemented within embodiments of the present invention.

According to an embodiment of the present invention, the processing unit 110 also interfaces with a machine learning model 150 to obtain system analysis information of the utility service components and determines the margin information provided via the margin manager 700 shown in FIG. 7. Additional details regarding the machine learning model will be discussed below. The utility service network information is transmitted via the processing unit 110 to the graphical user interface 120 to be displayed to the user, upon request.

The machine learning model 150 (as depicted in FIG. 1) which incorporates machine learning and pattern recognition algorithms to assist in analysis of the data such as that described in co-pending, commonly assigned U.S. patent application Ser. No. 12/178,553 entitled System and Method for Grading Electricity Distribution Network Feeders Susceptible to Impending Failure filed on Jul. 23, 2008 by Arthur Kressner, Mark Mastrocinque, Matthew Koenig and John Johnson which is incorporated by reference in its entirety. The processing unit 110 of the system 100 is configured to obtain the risk assessment information from the machine learning module 150.

Figure 8:
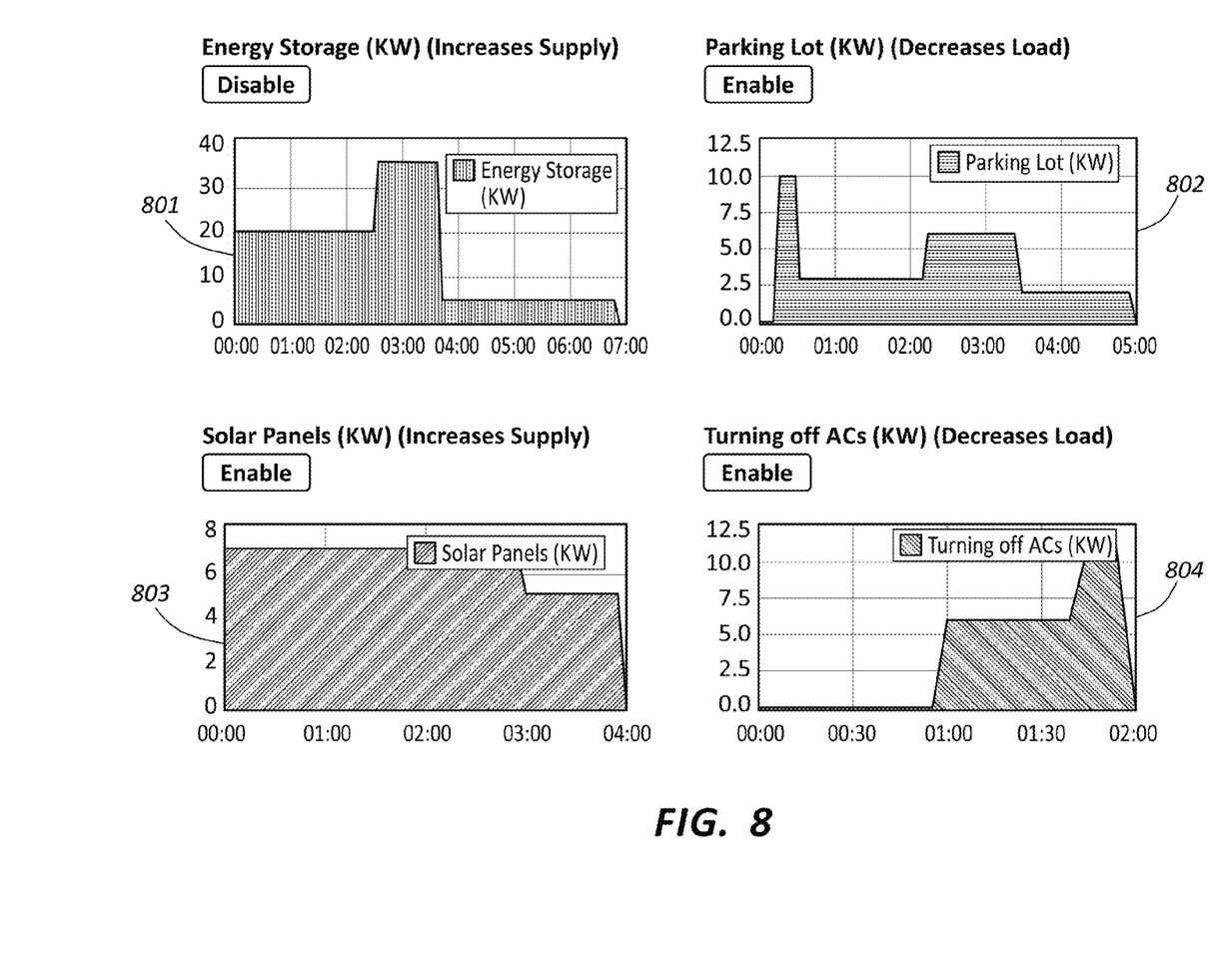
FIG. 8 is a diagram illustrating recommendation scenarios based on the margin information provided via the margin manager shown in FIG. 7.

FIG. 8 is a diagram illustrating recommendation information associated with the margin manager shown in FIG. 7. As shown in FIG. 8, a graph 801 illustrates an energy storage recommendation to increase supply, a graph 802 illustrates a parking lot recommendation to decrease load, a graph 803 illustrates PV solar panel installation recommendations to continue to supply based on current power quality level, and graph 804 illustrates a recommendation for turning off air conditioning units thereby decreasing load. The user is able to select one of these recommendations for implementation and observe the affect of the implementation of any of these recommendations via the margin manager 700 prior to implementation.

Embodiments of the present invention provide a method and system for providing grid/network information of a utility service network in a single integrated way. Therefore, the present invention provides the advantages of allowing the operator to simulate changes and see how the changes will impact the network prior to implementing the changes.

According to an embodiment of the present invention, the heat map and margin manager may be implemented based on measured data or from model data. According to an embodiment of the present invention, model data is simulated using real time load data from extrinsic variables such as weather, time of day, economic conditions (e.g., Dow Index level) with a high degree of accuracy. According to another embodiment of the present invention, when measured data is used, there may be some extrapolation of the data to provide load and supply information at locations between the measurements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to provide grid/network information for a utility service network in an automated and integrated way.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A computer-implemented method of providing electrical utility service grid information for an electrical utility service grid, the method comprising:
    obtaining electrical utility service grid information from a plurality of external sources;
    integrally combining the electrical utility service grid information obtained from each of the plurality of external sources into and displaying the electrical utility service grid information in real-time in a global positioning map to a user via a graphical user interface, the global positioning map comprising a heat map based on the electrical utility service grid information;

selecting, via the user, specific electrical utility service grid information of the electrical utility service grid information to be displayed; and automatically reconfiguring the electrical utility service grid or manually reconfiguring the electrical utility service grid via the user, as needed based on the specific electrical utility service grid information selected.

2. The computer-implemented method of claim 1, wherein the electrical utility service grid information comprises at least one of feeder information, transformer information, vehicle information, manhole information, electrical service box information and system outage information.

3. The computer-implemented method of claim 2, wherein the electrical utility service grid information further comprises status information comprising a current operating state of equipment of the electrical utility service grid.

4. The computer-implemented method of claim 3, wherein the method further comprises:

providing a graphical representation of sections of the electrical utility service grid affected by the electrical utility service grid information to the user via the graphical user interface upon request.

5. The computer-implemented method of claim 4, wherein the request is made by the user by drawing a clustering shape around at least one respective section of the electrical utility service grid affected.

6. The computer-implemented method of claim 5, further comprising:

providing specified structure information within the electrical utility service grid when selected by the user via the graphical user interface.

7. The computer-implemented of method claim 6, further comprising:

displaying load information, supply information and margin information corresponding to the load and supply information, in a graphical representation to the user via the graphical user interface when selected.

8. The computer-implemented method of claim 7, wherein the method further comprises:

obtaining system analysis information via a machine learning tool; and determining recommendations for reconfiguring the electrical utility service grid to be displayed to the user via the graphical user interface using the margin information displayed.

9. The computer-implemented method of claim 1, wherein the selection is made by the user via the graphical user interface using touch screen or stylus.

10. A non-transitory computer readable storage medium storing program instructions executable by a computer to perform a method of providing utility service network information for a utility service network, the method comprising:

obtaining utility service network information from a plurality of external sources;

integrally combining the utility service network information obtained from each of the plurality of external sources into and displaying the utility service network information in real-time in a global positioning map to a user via a graphical user interface, the global positioning map comprising a heat map based on the utility service network information;

selecting, via the user, specific utility service network information of the utility service network information, to be displayed; and automatically reconfiguring the utility service network or manually reconfiguring the utility service network via the user, as needed based on the specific utility service network information selected.

11. The non-transitory computer readable storage medium of claim 10, wherein the utility service network information comprises at least one of feeder information, transformer information, vehicle information, manhole information, electrical service box information and system outage information.

12. The non-transitory computer readable storage medium of claim 11, wherein the utility service network information further comprises status information comprises a current operating state of equipment of the utility service network.

13. The non-transitory computer readable storage medium of claim 12, wherein the method further comprises:

providing graphical representation of sections of the utility service network affected by the utility service network information to the user via the graphical user interface upon request.

14. The non-transitory computer readable storage medium of claim 13, wherein the request is made by the user by drawing a clustering shape around at least one respective section of the utility service network affected.

15. The non-transitory computer readable storage medium of claim 14, further comprising:

providing specified structure information within the utility service network when selected by the user via the graphical user interface.

16. The non-transitory computer readable storage medium claim 15, further comprising:

displaying load information, supply information and margin information corresponding to the load and supply information, in a graphical representation to the user via the graphical user interface when selected.

17. The non-transitory computer readable storage medium of claim 16, wherein the method further comprises:

obtaining system analysis information via a machine learning tool; and determining recommendations for reconfiguring the utility service network to be displayed to the user via the graphical user interface using the margin information displayed.

18. The non-transitory computer readable storage medium of claim 10, wherein the selection is made by the user via the graphical user interface using touch screen or stylus.

19. A system comprising:

a computer having a graphical user interface, the computer being configured to receive and transmit data to and from a user and interfacing with a processing unit configured to:

obtain utility service network information from a plurality of external sources;

integrally combine the utility service network information obtained from each of the plurality of external sources into and display the utility service network information in real-time in a global positioning map to a user via the graphical user interface, the global positioning map comprising a heat map based on the utility service network information and displayed by the graphical user interface;

receive a selection, via the user, for specific utility service network information of the utility service network information, to be displayed; and automatically reconfigure the utility service network or manually reconfiguring the utility service network via the user, as needed based on the specific utility service network information selected.

20. A computer-implemented method of providing utility service network information for a utility service network, the method comprising:

obtaining utility service network information from a plurality of external sources;

integrally combining the utility service network information obtained from each of the plurality of external sources into and displaying the utility service network information in real-time in a global positioning map to a user via a graphical user interface by a graphical representation of sections of the utility service network affected by the utility service network information to the user upon a user request;

selecting, via the user drawing a clustering shape around at least one respective section of the utility service network affected, specific utility service network information of the utility service network information to be displayed; and automatically reconfiguring the utility service network or manually reconfiguring the utility service network via the user, as needed based on the specific utility service network information selected.

21. The computer-implemented method of claim 20, further comprising:

providing specified structure information within the utility service network when selected by the user via the graphical user interface.

22. The computer-implemented of method claim 21, further comprising:

displaying load information, supply information and margin information corresponding to the load and supply information, in a graphical representation to the user via the graphical user interface when selected.

23. The computer-implemented method of claim 22, wherein the method further comprises:

obtaining system analysis information via a machine learning tool; and determining recommendations for reconfiguring the utility service network to be displayed to the user via the graphical user interface using the margin information displayed.

* * * * *